Nov. 6, 1962  R. O. GULDEN  3,062,042
TONOMETER
Filed June 4, 1959

INVENTOR.
RAYMOND O. GULDEN
BY

ATTORNEYS

United States Patent Office 3,062,042  
Patented Nov. 6, 1962

3,062,042  
TONOMETER  
Raymond O. Gulden, Jenkintown, Pa., assignor to George P. Pilling & Son Company, Philadelphia, Pa., a corporation of Pennsylvania  
Filed June 4, 1959, Ser. No. 818,034  
1 Claim. (Cl. 73—80)

This invention relates to tonometers of the type used for measuring ocular tension.

The objects of the present invention relate to improvements in construction, and corresponding operation, which may be briefly referred to as follows:

As heretofore constructed, tonometers have had plungers slidably and accurately guided within elongated cylinders. The fit was necessarily close but should be such as to involve a minimum of friction consistent with securing true measurements of ocular tension. However, the matter of securing low friction was defeated by the fact that tears would, by capillary action, rise in the sliding clearance between the plunger and cylinder leaving deposits creating excessive friction, as well as that due merely to liquid friction of the capillary film. Cleaning was difficult without considerable dismantling of the tonometer.

In accordance with the present invention the capillary rise of tears is prevented, except through a quite short extent of the barrel, by the provision of an internal groove surrounding the plunger adjacent to the foot of the cylinder. While, therefore, the necessary accurate sliding fit is maintained, there is much less likelihood that friction-producing material will be located through any extensive region of sliding contact, and where tears may enter they may be readily removed by a simple washing operation.

Tonometers heretofore provided have also involved extended sliding engagement between a holding frame and the exterior of the cylinder within which the plunger moves. Free sliding movement is here required due to the fact that the total load on the eye must not be affected by the position of the hand of the user. In accordance with the present invention a simple sliding mounting arrangement is provided which minimizes friction and which also permits easy cleaning.

Tonometers of the type to which the present invention relates have heretofor been substantially unbalanced, to the end that the user in presenting the tonometer to the eye to be tested was required to take care to secure a proper vertical approach. In accordance with the present arrangement there is provided, in conjunction with the fingers of the user a gimbal arrangement permitting swing of the instrument about a horizontal axis, with the instrument so designed and balanced that under the action of gravity the plunger and cylinder will automatically achieve a pendant vertical position. This result is achieved not only by centralizing and proper balancing of parts but also by the use of a light frame material such as aluminum, the other parts of the tonometer being generally of stainless steel.

Still another aspect of the present invention involves the use of jewel bearings for the anvil engaged by the plunger.

The improved tonometer also involves the use of an indicating scale of a rounded form which may be conveniently read through a large angle of visibility.

The objects of the invention relating to the foregoing and to other matters of construction will become apparent with the following description read in conjunction with the accompanying drawing, in which.

Figure 1:
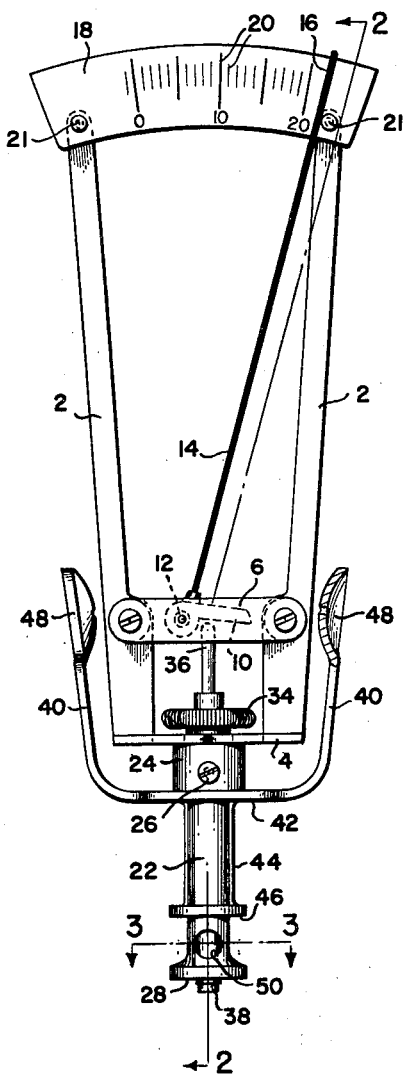
FIGURE 1 is a front elevation of the improved tonometer.
Figure 2:
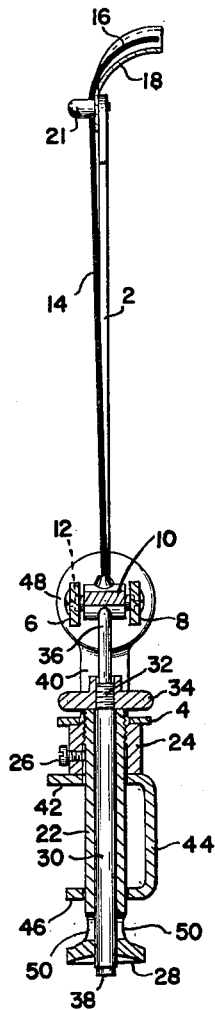
FIGURE 2 is a section taken on the broken surface shown at 2—2 of FIGURE 1.

The tonometer illustrated comprises the frame 2 having base 4 and a pair of cross struts 6 and 8 secured to the main portion of the frame by suitable spacers and screws. Between them these struts provide a space for the rocking of the anvil 10 which has a shaft engaged in jewel bearing indicated at 12. An excellent anti-friction mounting is thus provided. As is usual, the anvil 10 has secured thereto a pointer 14, which in accordance with the present invention has a curved upper end as indicated at 16 extending upwardly and over a curved scale member 18, also of light material such as aluminum, secured to the upper ends of the arms of the frame 2. The surface of the scale member 18 adjacent to which the pointer moves is in the form of a segment of a torus having the axis of the hammer as its center. The pointer 14 has its upper end 16 slightly spaced from the scale member which carries the conventional markings 20, which, however, are extended about the toroidal surface of the scale member. Stop pins 21 limit the range of movement of the pointer relative to the scale. As will be evident, the construction just described makes possible the reading of the position of the pointer against the scale through a large angle of view ranging, more or less, through 90°. Thus, the tonometer is convenient to use since the user does not have to bring his eye level to that of the scale for proper reading.

The cylinder 22 is externally threaded at its upper end to receive an adjusting nut 24 which is arranged to be held in adjusted position by a set screw 26. The cross member 4 of the frame 2 is secured to this nut by swaging or in other fashion, and zero adjustment is thus provided as is conventional.

The cylinder 22 is provided with the usual downwardly concave foot 28 to conform with the eye.

The plunger 30 is mounted in the bore of the cylinder 22 and is threaded at its upper end as shown at 32 to receive the usual weight 34 which, in its lowermost position in engagement with the upper end of the cylinder, provides the standard three millimeter protrusion of the lower end 38 of the plunger 30 from the foot 28. This weight, as usual, is provided with a hub portion which serves for the reception of additional weights. The upper projecting portion 36 of the plunger is adapted to engage the pivoted anvil 10.

For support of the elements described there is the bracket 40 which is formed of sheet material and comprises the cross member 42 from which there projects downwardly the portion 44 having a horizontally directed end 46. The cross member 42 and the end 46 have openings loosely embracing the cylinder 22 to provide free relative axial motion when the tonometer is in use.

In accordance with the invention the upwardly extending arms of the bracket 40 are provided with sockets as indicated at 48 for the reception of the finger and thumb of the user. By reason of the provision of the sockets, a release of pressure provides for quite free pivoting of the bracket and the rest of the assembly about a horizontal axis. The parts are so constructed that the center of gravity of the assembly of frame 2, cylinder 22 and their associated parts is well below a transversed line through the sockets 48 and so located that when the sockets are freely pivoted on the fingers of the user the axis of the plunger and cylinder is very nearly vertical. The existence of this condition is particularly aided by constructing the frame 2, struts 6 and 8 and scale member 18 of light material such as aluminum, the remaining dependent parts being considerably heavier due to their formation from stainless steel.

It will be evident that what has just been described has considerable advantage to the user in the proper positioning of the tonometer in its approach to the eye. Whereas, heretofore the user had to grasp the bracket tightly to guide it to an estimated vertical position, in the use of the present tonometer it should be held quite lightly so as to be free to swing and then the proper vertical position of approach will be insured by the action of gravity.

Figure 3:
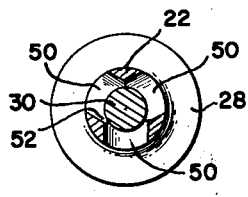
FIGURE 3 is an enlarged transverse section taken on the plane indicated at 3—3 in FIGURE 1.

The prevention of rise of tears by capillary action is effected in a simple fashion in accordance with the invention by the provision of a groove in the interior of the cylinder 22 having free drainage openings to the exterior. This is conveniently accomplished by the drilling of one or more holes through the cylinder 22 just above the foot 28. A desirable arrangement is that illustrated in FIGURE 3 in which three holes 50 are radially drilled at 120° spacing from each other, each hole having a diameter slightly larger than the diameter of the axial bore of the cylinder. The result of the intersection of these holes, then, is the provision, in effect, of an annular groove as indicated at 52 which through the holes 50 has drainage outlets to the exterior of the cylinder. An equivalent construction may be provided by the drilling of a single transverse hole having a diameter greater than that of the axial bore through the cylinder, or more than three holes may be drilled so spaced that their intersections will provide a clearance groove about the plunger 30. As will be evident, tears may rise by capillary action through a quite short distance from the lower surface of the foot 28 to the location of the groove, but this is unobjectionable because of the limited extent of such capillary rise and because the accumulation of solids, if any, may be readily flushed out merely by running water into the holes 50 while imparting oscillatory movements to the plunger. The arrangement disclosed is superior to arrangements heretofore used involving reduction of diameter of the plunger in the vicinity of the foot, or enlargement locally of the guide bore through the cylinder. Both of such expedients intended to prevent capillary rise were actually ineffective because tears would nevertheless get into the region of small sliding clearance between the plunger and the cylinder.

The various operations involved will be evident from the foregoing and need not be further described. It will be noted that the objectives of the invention are properly and effectively secured with a minimum of complexity of construction. It will be understood that various details may be changed without departing from the construction as defined in the following claim.

What is claimed is:

A tonometer comprising, a cylindrical member having a lower foot portion,
    said foot portion including a concave surface adapted to overlie and rest upon the surface of the eye,
    said member having a vertical bore therein extending upwardly from said concave surface,
    an elongated plunger journaled in said bore so as to form a sliding fit therein,
    the surface of said bore having an annular groove therein, said member having a plurality of radial ports connecting said groove to the external surface of said member,
    said plunger including a lower portion projecting downwardly beyond said concave surface for depressing the surface of the eye,
    a frame secured to said member and extending upwardly thereof,
    said frame mounting a scale and a pointer for movement relative to said scale,
    said pointer being operatively connected to move in response to movement of said plunger,
    at least one calibrated weight carried by said plunger for causing said plunger to depress the surface of the eye with a known force,
    a support bracket having a pair of axially spaced flanges,
    said flanges having axially aligned apertures within which said member is slidably received,
    an adjustable stop element secured to said member to provide an abutment surface for said upper flange,
    said bracket further including a pair of arms extending upwardly of said member and terminating in a pair of spherical sockets adapted to receive the fingertips of the user,
    said member being sufficiently heavier than said frame so that the center of gravity of the tonometer is below said spherical sockets regardless of the size of said calibrated weight.

References Cited in the file of this patent

UNITED STATES PATENTS

| | | |
|---|---|---|
| 527,034 | Weston | Oct. 2, 1894 |
| 2,314,514 | Parsons | Mar. 23, 1943 |
| 2,520,223 | Sovatkin | Aug. 29, 1950 |
| 2,656,715 | Tolman | Oct. 27, 1953 |
| 2,708,847 | Esterman | May 4, 1955 |
| 2,836,173 | Uemura et al. | May 27, 1958 |
| 2,968,941 | Papritz | Jan. 24, 1961 |